Aug. 16, 1949.　　　　　H. F. WILMS　　　　　2,479,445
TWO-SPEED TRANSMISSION
Filed June 12, 1946　　　　　　　　　　　　2 Sheets-Sheet 1

INVENTOR.
HENRY F. WILMS.
BY Fay, Golrick & Fay
Attorneys.

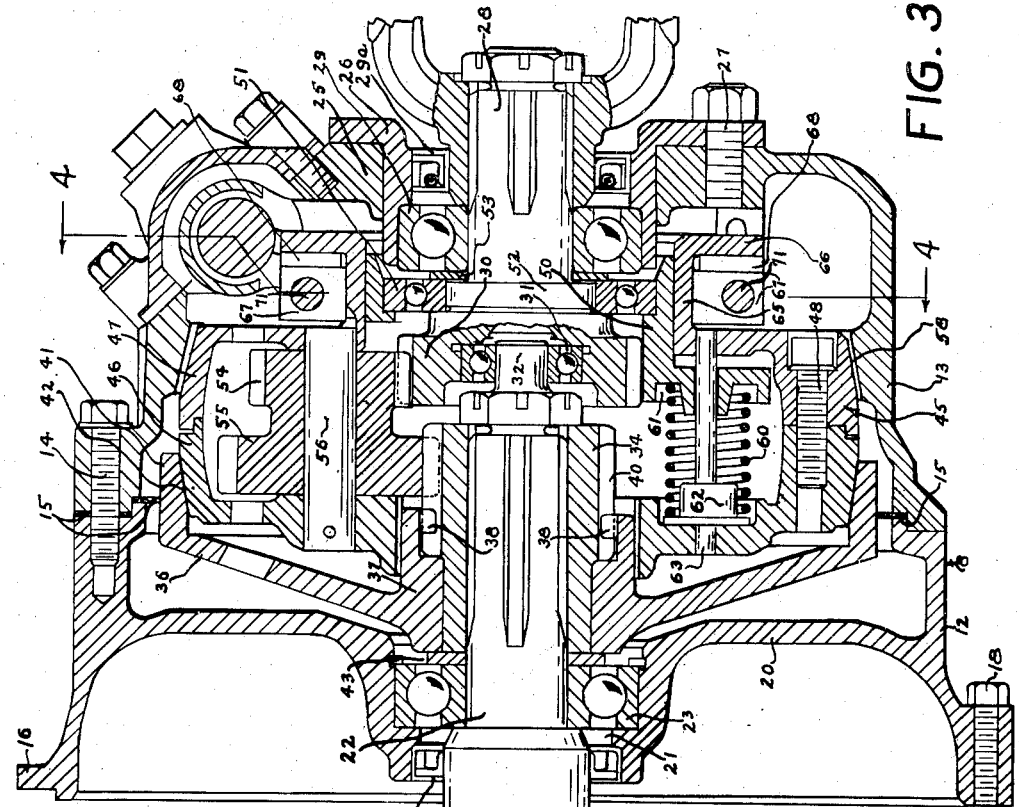

Patented Aug. 16, 1949

2,479,445

UNITED STATES PATENT OFFICE 2,479,445

TWO-SPEED TRANSMISSION

Henry F. Wilms, Cleveland, Ohio, assignor to The Elwell-Parker Electric Company, Cleveland, Ohio, a corporation of Ohio Application June 12, 1946, Serial No. 676,260

1 Claim. (Cl. 74—789)

The present invention relates to a two speed gear transmission particularly suitable for use in electrically driven industrial trucks.

It is often desirable to provide a gear reduction in an electrically driven industrial truck so that the truck may be driven by a direct drive for normal loads and through a gear reduction for abnormal loads. The present gear transmissions require a relatively lengthy period for changing from one gear to another and during that time the motor is disconnected from the drive wheels, and unless the operator turns the current off, the motor will speed up or "run away," inasmuch as these motors are generally series wound. Thus, when approaching a grade, for example, the truck operator must decide before he starts up the grade which gear speed to select, or otherwise, he may be forced to stop on the grade in order to change the gears.

An object of the present invention is to provide a two speed gear transmission for electrically driven industrial trucks in which the gear ratios are changed with such rapidity that the motor cannot obtain excessive speeds although the motor is maintained energized during the gear changing operation.

Another object of the invention is to provide a gear transmission for industrial trucks in which the gears are always in mesh and the gear ratios may be changed without causing disengagement of certain gears and the meshing of certain other gears.

Other objects and advantages of the invention will be apparent from the following description of a preferred form of the invention, reference being made to the accompanying drawings wherein:

Fig. 2 is a side view of the gear transmission, a portion of certain members of the transmission being shown broken away and in section;

Fig. 3 is a view in section of the gear transmission, the view being taken substantially along line 3—3 of Fig. 4;

Figure 4:
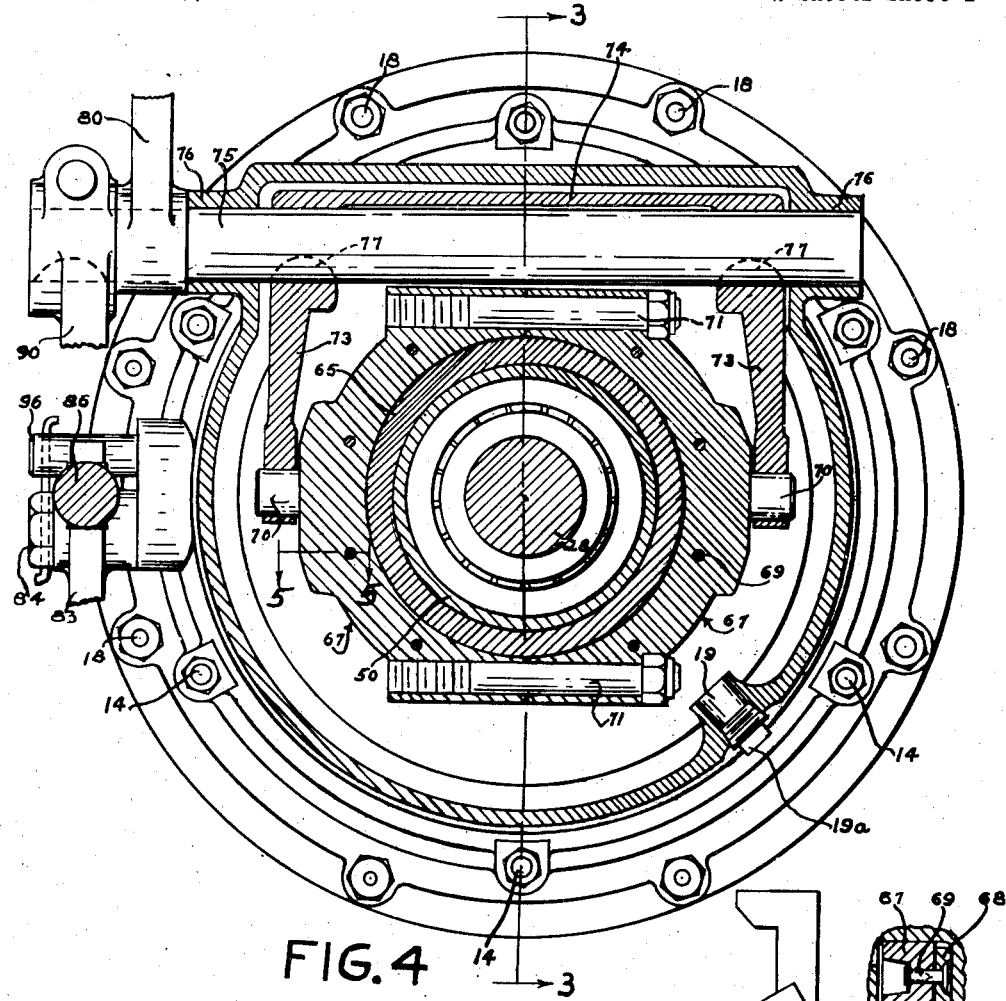
Fig. 4 is a view in section taken substantially on line 4—4 of Fig. 3, but on a smaller scale.
Figure 5:
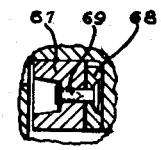
Fig. 5 is a fragmentary view in section taken along line 5—5 of Fig. 4.

Referring to the drawings, there is shown an industrial truck 5 that is adapted to be driven by an electrical motor indicated generally at 6, which motor is powered by suitable batteries carried on the truck, but which are not shown. The truck is provided with driving wheels 7 which are driven by the motor 6 through a gear transmission 8 and a conventional axle, not shown. The truck is also provided with dirigible wheels 9 and a load-carrying elevator or platform 10. There is provided the usual electrical controls for the motor 6 as well as steering apparatus for the wheels 9, but since these mechanisms are well known, they have been omitted from the drawings for the sake of clarity.

The speed transmission 8 includes a casing formed by members 12 and 13, which members are secured together by bolts 14. Preferably, gaskets 15 are interposed between the abutting parts of the members 12 and 13 forming an oiltight seal between the two members. The casing is provided with an opening 19 through which lubricating oil may be introduced into the casing, the opening being closable by a plug 19ª threaded into the opening.

The member 12 is provided with a flange 16 by which the transmission may be secured to the motor housing 17 by bolts 18 extending through openings in the flange. The member 12 is also provided with a partition wall 20 having a central opening 21 through which a drive shaft 22 of the motor 6 is extended. A ball bearing 23 is secured in the opening 21 and the drive shaft 22 is journalled in this bearing. Preferably, an oil seal 24, which may be of any well known type suitable for this purpose, is interposed between the walls of the opening 21 and the shaft 22 for preventing the loss of oil from the casing.

The casing member 13 has an opening 25 formed therein which is axially aligned with the opening 21 of casing member 12 and a flanged collar 26 is press fitted in the opening and secured to the casing by a plurality of bolts 27, only one of which appears in the drawing. A driven shaft 28, which is connected with the axle of the truck through the usual suitable mechanism, not shown, extends through the collar 26 and is journalled in the collar by a ball bearing 29, which bearing is press fitted in the collar 26. Preferably, a seal 29ª, similar to seal 24, is provided between shaft 28 and the inside of collar 26 for preventing loss of oil from the casing. The shafts 22 and 28 are axially aligned, and the inner end of the driven shaft 28 is provided with a gear 30 which is formed integral therewith. Also, the inner end of shaft 28 is recessed and carries a ball bearing 31 in which a reduced end portion 32 of the drive shaft 22 is journalled. Thus, the inner end of the drive shaft 22 is further supported in the end of the driven shaft 28.

A drive gear 34 is secured to the end of the drive shaft 22 by a splined connection so that the gear is positively driven by the shaft, and the diameter of the gear 34 is somewhat less than the diameter of the gear 30 on the driven shaft 28.

A cone clutch member 36, which includes a hub portion 37, is mounted on the drive shaft 22 and is adapted to be rotated by shaft 22 through teeth 38 which mesh with the teeth 40 of the gear 34. At the periphery of the clutch member 36 is a flange portion 41, which forms a clutching surface 42, the purpose of which will be made apparent hereinafter. Preferably, a washer 43 is interposed between the bearing 23 and the member 36 for maintaining the latter in driving relation with the gear 34.

A drum-like housing 45 is provided which is adapted to rotate about an axis common to that of the shafts 22 and 28. The housing 45 is formed by two dish shaped complementary members 46 and 47 which are joined together by a plurality of bolts 48. The housing member 47 is rotatively supported on a flanged sleeve 50 by a ball bearing 51 having the outer race press fitted in the sleeve 50 and the inner race press fitted on a bead 52 formed on the driven shaft 28. Preferably, a spacer washer 53 is provided between the bearings 29 and 51.

The housing 45 rotatably supports a plurality of sets of gears 54 and 55, only one of which sets appears in the drawings, the gears of each set being interconnected so that each set of gears rotate as a unit. These gears are both mounted on shafts 56 that are in turn journalled in openings in the members 46 and 47. Preferably, there are three sets of gears 54 and 55, but it is to be understood that any convenient number of sets of gears may be used, and the sets are spaced apart equally for establishing a balanced condition about the housing. Gear 55 is of greater diameter than gear 54 and gear 55 is in mesh at all times with gear 34 of the drive shaft 22 and gear 54 is in mesh at all times with gear 30 of the driven shaft 28. Thus, it will be apparent that if the housing 45 is rotated as a unit with the drive shaft 22, there will be a direct drive established between the drive shaft and driven shaft. If the housing 45 is maintained stationary while the drive shaft 22 is driven, there will be a speed reduction between the drive shaft and the driven shaft through gears 54 and 55. In carrying out my invention I provide means for causing the housing 45 to rotate as a unit with the drive shaft for obtaining a direct drive, and means is also provided for maintaining the housing 45 stationary when it is desired to cause a gear reduction to be effected.

In order to provide for the control of the movement of housing 45, the housing may be moved longitudinally of its axis in opposite directions for frictional engagement with two oppositely disposed clutch and brake members 36 and 58, respectively. In the present embodiment of the invention one member is fixed or non-rotative and serves as a brake and the other clutch member is adapted to rotate. The outer periphery of the member 46 of housing 45 is tapered and this portion is adapted to frictionally engage a complementary tapered face on the flange 41 of the clutch member 36 when the housing 45 is moved to its left-hand position, as is shown in Fig. 3. The periphery of the member 47 of casing 45 is tapered and this portion is adapted to frictionally engage a complementary tapered surface 58 formed about the interior of the housing member 13 when the casing 45 is moved from the clutch member 36 to the right, as viewed in Fig. 3. Thus, when the casing 45 is moved into engagement with the clutch member 36, the casing 45 will be rotated with the drive shaft 22 through the medium of the clutch member 36, and when the casing 45 is moved to its right-hand position, it is maintained stationary by engagement with the surface 58 of the casing, which surface acts as a brake. It will be noted that only a slight movement of the casing along its axis is necessary to cause engagement with one or the other of the members 36 or 58 which controls the rotation of the casing.

The casing is normally urged into frictional engagement with the clutch member 36 by a plurality of coil springs 60, only one of which appears in the drawings, one end of which spring is housed in a recess 61 formed in the flange of sleeve 50 and the opposite end of the spring 60 is centered on a flanged head 62 that is mounted on a rod 63 which is secured in the housing members 46 and 47. The spring 60 reacts on the flange of sleeve 50 for urging the casing 45 to the left, as viewed in Fig. 3. It will be understood that the springs 60 are spaced equidistant about the housing for maintaining a balanced condition in the housing, and preferably there are as many springs 60 as there are sets of gears 54 and 55.

For the purposes of moving the housing 45 on its axis, the member 47 has a collar portion 65 formed thereabout and an outturned flange 66 formed in the outer end of the neck-like portion. This forms an annular channel about the outer end of the casing 45 and two semi-circular shoe members 67 secured together by bolts 71 to form an annular operating shoe, are mounted in the channel. The shoe members 67 each include a friction face member 68 which is riveted to the shoes by rivets 69. The shoe members are each provided with a laterally extending pin 70 by which the operating shoe may be actuated.

The operating shoe 67 is adapted to be actuated in opposition to springs 60 by a pair of arms 73 which are joined by a tubular yoke 74, which yoke is supported on a shaft 75 journalled in bearings 76 formed in the housing member 13. The yoke member 74 is keyed to the shaft 75 as indicated at 77 so that when the shaft 75 is rotated, the arms 73 will rock in the direction of the axes of the shafts 22 and 28. The lower ends of the arms 73 receive the pins 70 of the shoe 67 so that by rocking the shaft 75 the shoe 67 will cause movement of the housing 45 along its axis.

The shaft 75 is adapted to be rocked by a hand lever 80 or a foot pedal 81 both located conveniently to the operator of the truck. The lever 80 is journalled on the shaft 75 and it is provided with an arm 82. The arm 82 is connected to a lever 83, which is pivoted at 84 to the casing 8, by a link 85, the link being connected to the ends of arm 82 and lever 83 by pivot connections. Lever 83 has a toggle link 86 pivotally connected thereto at 87 and the toggle link 86 extends through an opening through through a revoluble pin 88 that is journalled within a slot 89 formed in the end of a lever 90. The opposite end of lever 90 is keyed to the shaft 75 so that swinging of lever 90 rotates the shaft 75.

Figure 1:
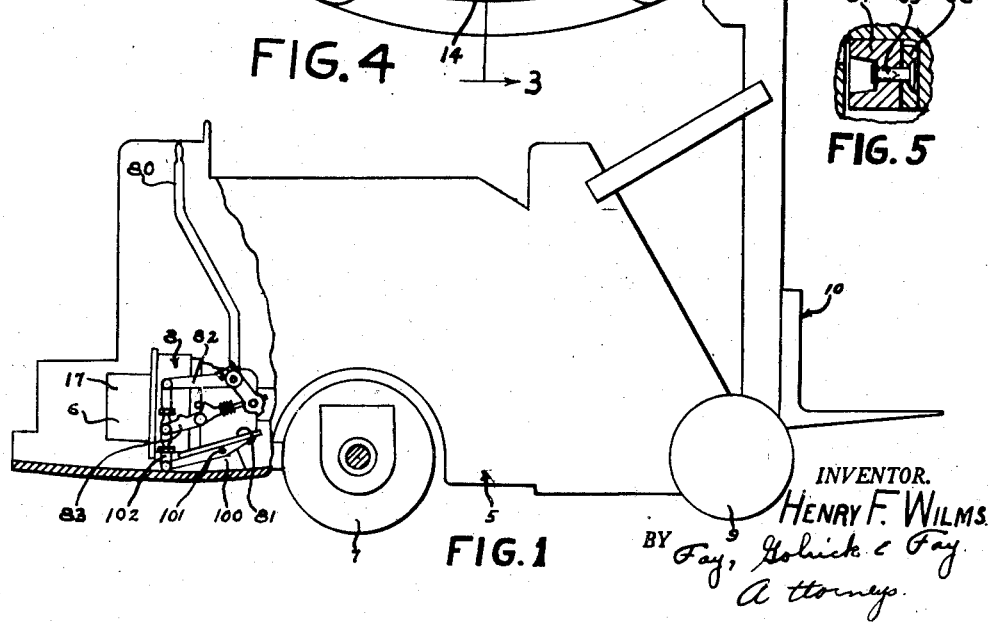
Fig. 1 is a diagrammatic illustration of an industrial truck embodying the invention, part of the truck being broken away to show the location of the transmission.

A relatively heavy coil spring 92 is interposed between the pin 88 and a collar 93 threaded on the toggle link 86 for establishing a resilient reaction between lever 90 and the toggle link 86. When the lever 80 is in the position shown in Fig. 1, which corresponds to the full line position shown in Fig. 2, the center of the joint 87 will lie above a line interconnecting the center of pivot 84 and the center of connection between link 86 and pin 88. Thus, the tension of spring 92 will tend to maintain the lever 83 biased counterclockwise and against a stop 96 provided on the casing 8. This maintains the housing 45 against the clutching surface 58 and the gear transmission will be in low gear. When lever 80 is moved clockwise as viewed in Fig. 1, the toggle between lever 83 and link 86 will be broken and lever 83 will be rotated clockwise against stop 96 as shown by the dotted lines of Fig. 2 and lever 90 will be moved clockwise by the force of springs 60 acting through housing 45 arms 73 and shaft 75 to permit movement of the housing 45 into engagement with the clutch member 36 for effecting direct drive between the driving and driven shafts.

If desired, the operator may shift the housing operating mechanism by use of pedal 81. Pedal 81 is pivoted on a bracket 100 by a pin 101, and the rear end of the pedal 81 is connected to lever 83 by a link 102.

It will be apparent that by my invention, the operator of the truck may quickly change the gear ratio of the truck without the necessity of attending to the electric control of the motor and a smooth change of gear ratios may be effected at any time desired.

Although I have described but one form of embodiment of the invention, it is to be understood that other forms might be adopted, all falling within the scope of the claim which follows.

I claim:

A two speed drive transmission for industrial trucks and the like, comprising, a drive shaft and a driven shaft axially aligned with one another and each having a gear mounted thereto; a hollow housing mounted for rotation about the axis of said shafts and for axial movement relative to said shafts; two connected gears journalled in said housing, one of said connected gears being meshed with the gear on the drive shaft and the other connected gear being meshed with the gear on the driven shaft; an annular clutch member mounted on the drive shaft and disposed adjacent to one side of the housing; a brake member disposed adjacent the opposite side of the housing, said clutch and brake members being alternately engaged by said housing when the housing is moved in opposite directions axially for frictionally connecting one or the other of said members with the housing, said clutch member being rotated relative to the brake member; a support element mounted for rotation about the axis of said shafts and within said hollow housing; a spring interposed between said support element and a wall of the housing for urging the housing toward one of said members; and means for moving the housing against the action of said spring and into engagement with the other of said members.

HENRY F. WILMS.

REFERENCES CITED

The following references are of record in the file of this patent:

UNITED STATES PATENTS

| Number | Name | Date |
|---|---|---|
| 802,175 | Seeley | Oct. 17, 1905 |
| 924,323 | Daimler | June 8, 1909 |
| 958,797 | Fentress | May 24, 1910 |
| 1,167,718 | Rost | Jan. 11, 1916 |
| 1,540,247 | Bowman | June 2, 1925 |

FOREIGN PATENTS

| Number | Country | Date |
|---|---|---|
| 9,111 | Great Britain | Apr. 19, 1902 |
| 128,940 | Germany | Mar. 17, 1902 |